(Model.)

J. McNEAL.
FISHING FLOAT.

No. 326,134.  Patented Sept. 15, 1885.

Witnesses:
T. C. Brecht
W. E. Stearns

Inventor:
James McNeal
by R. K. Evans
Attorney.

UNITED STATES PATENT OFFICE.

JAMES McNEAL, OF WASHINGTON, DISTRICT OF COLUMBIA, ASSIGNOR OF ONE-HALF TO CHAS. H. SEATON, OF SAME PLACE.

FISHING-FLOAT.

SPECIFICATION forming part of Letters Patent No. 326,134, dated September 15, 1885.

Application filed February 2, 1885. (Model.)

*To all whom it may concern:*

Be it known that I, JAMES MCNEAL, of Washington city, District of Columbia, have invented a new and Improved Fishing-Float; and I hereby declare the following to be a full, clear, and exact description of the same, reference being had to the accompanying drawings, making a part of this specification, in which—

Figure 1:
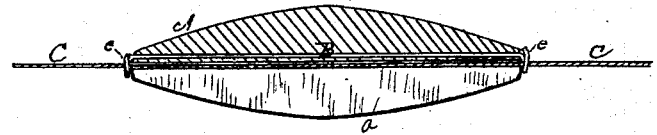
Figure 2:
Figure 3:
Figure 4:
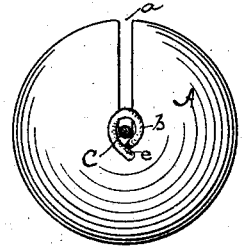

Figure 2 is a side elevation of the float attached to the fishing-line. Fig. 1 is a vertical longitudinal section of the same. Fig. 3 is an end view of the float, and Fig. 4 is an enlarged end view of the same.

There are two highly-desirable, not to say necessary, elements to be combined in a fishing float or bob in order to have it fully meet the requirements of the angler—first, the float should be readily adjustable upon the line or removable from it without disturbing the lead or hooks, and, second, the fastenings securing the float to the line should be such as not to require any winding of the line about them or the creation of any bights in the line, which necessarily decrease the tensile strength and render it liable to break in such bights or twists when the strain in "striking" a fish is brought upon the line.

The object of my invention is to embody in a fishing-float both of these desirable elements; and to this end my invention consists in a slotted float through which, at or near its center, passes a wire having its ends formed into a bight bent at right angles to the body of the wire so as to lie against the ends of the float and clasp the line, the ends of the wire being closed upon the body so they can be sprung out to insert the line, all of which is hereinafter fully described, and specifically pointed out in the claims.

In order that those skilled in the art may make and use my invention, I will proceed to describe the manner in which I have carried it out.

In the said drawings, A is the body of the float, which can be made of any material desired, and provided with a slot, *a*. If this body is of wood, it may be found desirable to bevel the sides of the said slot *a* to compensate for the swelling of the body when wet, tending to close it.

Through the length of the body, at or near its center, extends a wire, B, having means at its ends to engage the line C and hold the float to it. These engaging ends of the wire consist of two bights or loops, *b*, bent down at right angles to the body of the wire, the ends being brought close to the body and given for a minimum distance a reverse curve at *e*, to prevent the ends of the wire from accidentally engaging with or entangling the line.

When the wire B is in its normal position, the openings in the loops *b* lie over the ends of the slot *a*, though they may be turned in either direction together, so as to slightly pass the ends of the slot, and the friction will retain said loops in whatever position placed. (See Fig. 3.) If the ends of the float wear away, the loops may be pressed down so as to again come in frictional contact with the body and retain them in any desired position.

The line is laid in slot *a* and passed around the ends of the wire and sprung into the loops *b*, which engage and hold it in such frictional contact with the body A as to prevent said body under ordinary strains from changing position on the line, and yet leave the line so that any strain upon it will be distributed evenly throughout its length, and is relieved of undue strains at particular points, due to wrappings, bights, or sudden changes in direction of the line, where breakage usually occurs.

The float is quickly removed from the line by passing the line out of the loops *b* in the manner reverse to the engagement.

It is obvious that the fastening described may be applied to other fishing appliances to be removably attached to the line without departing from the spirit of my invention.

I am aware of the patent to Redfield, No. 188,755, and do not claim anything therein shown and described, as the fastening therein described generally requires bights in the line to secure the float with practical certainty.

Having thus described my invention, what I claim as new, and desire to secure by Letters Patent, is—

1. A fishing-float provided with line-attaching devices consisting of bent loops at its ends at about right angles to the axis of the float, whereby twists, bights, or sudden changes in direction of the line are avoided, substantially as set forth.

2. A fishing-float provided with a body, A, in combination with a wire, B, passing through its length, and having on its ends fastening devices having a movement in the arc of a circle to engage the line, for the purpose specified.

3. In a fishing-float, the central wire, B, extending entirely through the float, and provided at its ends with loops $b$, bent at right angles, and having their ends adapted to be sprung open to receive the line, substantially as described.

4. In a fishing-float, the body A, provided with the slot $a$, in combination with the central wire, B, provided with loops $b$ on its ends, adapted to move across the ends of the slot, substantially as set forth.

JAS. McNEAL.

Witnesses:
A. G. KELLOGG,
R. K. EVANS.